United States Patent

Suzuki et al.

[11] Patent Number: 5,823,314
[45] Date of Patent: Oct. 20, 1998

[54] WET FRICTIONAL ENGAGEMENT PLATE

[75] Inventors: Makoto Suzuki; Masaki Sakai, both of Shizuoka, Japan

[73] Assignee: NSK-Warner Kabushiki Kaisha, Tokyo, Japan

[21] Appl. No.: 760,631

[22] Filed: Dec. 4, 1996

Related U.S. Application Data

[63] Continuation of Ser. No. 356,520, Dec. 15, 1994, abandoned.

[30] Foreign Application Priority Data

Dec. 15, 1993 [JP] Japan .................................. 5-342227
Feb. 21, 1994 [JP] Japan .................................. 6-044704

[51] Int. Cl.⁶ .................................................. F16D 69/00
[52] U.S. Cl. ........................................ 192/107 M; 106/36
[58] Field of Search ................ 192/107 M; 188/251 A; 428/66.2; 523/156, 158; 106/36

[56] References Cited

U.S. PATENT DOCUMENTS

| | | | |
|---|---|---|---|
| 2,945,292 | 7/1960 | Luther et al. .................... | 106/36 X |
| 2,966,737 | 1/1961 | Spokes et al. ................... | 106/36 X |
| 2,992,707 | 7/1961 | Lewis .............................. | 192/107 M X |
| 3,554,860 | 1/1971 | Lacroix ........................... | 192/107 M X |
| 3,842,031 | 10/1974 | Lumb et al. ..................... | 106/36 X |
| 3,932,568 | 1/1976 | Watts et al. ..................... | 106/36 X |
| 3,972,394 | 8/1976 | Jacko et al. ..................... | 106/36 X |
| 4,014,850 | 3/1977 | Thorpe ............................ | 106/36 X |
| 4,118,528 | 10/1978 | Lowry ............................. | 192/107 M X |
| 5,114,769 | 5/1992 | Kani et al. ..................... | 192/107 M X |
| 5,281,481 | 1/1994 | Hayward ........................ | 192/107 M X |

FOREIGN PATENT DOCUMENTS

| | | | |
|---|---|---|---|
| 1268697 | 12/1961 | France ............................. | 192/107 M |
| 58-189232 | 11/1983 | Japan . | |
| 62-149629 | 9/1987 | Japan . | |
| 478331 | 3/1992 | Japan . | |
| 6173983 | 6/1994 | Japan . | |

*Primary Examiner*—Rodney H. Bonck
*Attorney, Agent, or Firm*—Sughrue, Mion, Zinn, Macpeak & Seas, PLLC

[57] ABSTRACT

A wet frictional engagement plate comprising a core metal having a surface and a wet frictional material containing a fiber component, a filler, a friction adjustment agent and a thermosetting resin, the wet frictional material being fixed onto a surface of the core metal. Before or after the wet frictional material is fixed onto the surface of the core metal, the surface of the wet frictional material is subjected to a surface treatment process comprising pressing a smooth-faced hot plate of a temperature in a range of from 350° C. to 550° C., which temperature is selected so that it does not carbonize the thermosetting resin, against the surface of the wet frictional material for a time in a range of from 1 to 5 seconds. The wet frictional engagement plate has a friction coefficient which does not change and remains stable from initial use, and also has a long endurance life.

8 Claims, 2 Drawing Sheets

WET FRICTIONAL ENGAGEMENT PLATE

This is a Continuation of application Ser. No. 08/356,520 filed Dec. 15, 1994 and now abandoned.

BACKGROUND OF THE INVENTION

1. Field of the Invention

The present invention relates to a wet frictional engagement plate for use in an automatic transmission or the like, and particularly to a wet frictional engagement plate having a friction coefficient that remains stable from initial use and having good durability.

2. Description of the Related Art

In a conventional wet frictional engagement plate, a frictional material is fixed onto the surface of a core metal. The frictional material contains: a fiber base material such as natural pulp fibers, organic synthetic fibers or the like; a filler such as diatomaceous earth or the like; a frictional adjustment agent such as cashew resin or the like; and a thermosetting resin. The surface of the frictional material has small irregularities caused by the entanglement of fibers, and its initial friction coefficient is small because of the thermosetting resin which adheres to the surface of the fibers. The frictional surface, however, tends to become conformable as it is used, so that the friction coefficient increases.

In the case of a car having an automatic transmission, therefore, tuning is performed based on the friction coefficient at its initial state, so that the transmission time becomes shorter as the distance travelled increases. As a result, a problem occurs in that the feel of driving varies, etc.

Although conventional frictional plates exhibit this problem, a variety of solutions have been proposed.

For example, in one such proposal, a slidable member is separately provided so as to be pressed against a frictional plate. The slidable member is rubbed against the frictional plate for a predetermined time to increase its temperature, and to thereby harden the resin component of the frictional surface and stabilize the frictional coefficient. This technique is described in JP-A-4-78331 (the term "JP-A" as used herein means an "unexamined published Japanese patent application").

Indeed, the frictional coefficient can be stabilized by this method. In order to obtain the desired performance, however, a certain amount of time is required to perform running-in in oil in which the mate-member is set. Furthermore, the workability is poor and the cost is high.

In another proposal, a surface portion of a frictional material is irradiated with laser light so that an organic bonding agent is burned or partially thermally decomposed to thereby carbonize at least a portion of the frictional material. As a result, excessive organic bonding agent is eliminated to prevent the initial friction coefficient from decreasing. This is described in JP-A-58-189232.

In a further proposal, a hot plate of 600° C. is pressed against a frictional plate so as to carbonize the binder in the frictional plate. This is described in Japanese Utility-Model Unexamined Publication No. Sho-62-149629.

The intent of these proposals is to stabilize the friction coefficient by heating the resin to its decomposition temperature or higher so as to carbonize the resin. This results in a considerable loss of durability due to a decrease in the strength of the frictional material or abrasion of the surface-carbonized layer.

SUMMARY OF THE INVENTION

It is therefore an object of the present invention to solve the foregoing problems.

It is another object of the invention to provide a wet frictional engagement plate having an initial friction coefficient which remains stable from initial use and having good durability.

The foregoing objects are achieved, according to the present invention, by providing a wet frictional engagement plate comprising a wet frictional material containing a fiber component, a filler, a friction adjustment agent and a thermosetting resin, wherein the surface of the wet frictional material is subjected to a surface treatment process comprising pressing a smooth-faced hot plate of a temperature in a range of from 350° C. to 550° C., against the surface of the wet frictional material for a time in a range of from 1 to 5 seconds, so as to smooth the surface of the wet frictional material without carbonizing the thermosetting resin. The surface treatment process is carried out before or after the wet frictional material is fixed onto a surface of a core metal.

BRIEF DESCRIPTION OF THE DRAWINGS

A more detailed description of FIGS. 3, 4 and 5 is as follows. The band shaped wet frictional material shown in FIG. 3 is labelled (10). The ring-shaped wet frictional material shown in FIG. 4 is labelled (12). FIG. 5 shows a wet frictional engagement plate having a core metal (16), onto which is fixed a surface treated wet frictional material (18).

DETAILED DESCRIPTION OF THE PREFERRED EMBODIMENTS

Figure 1:
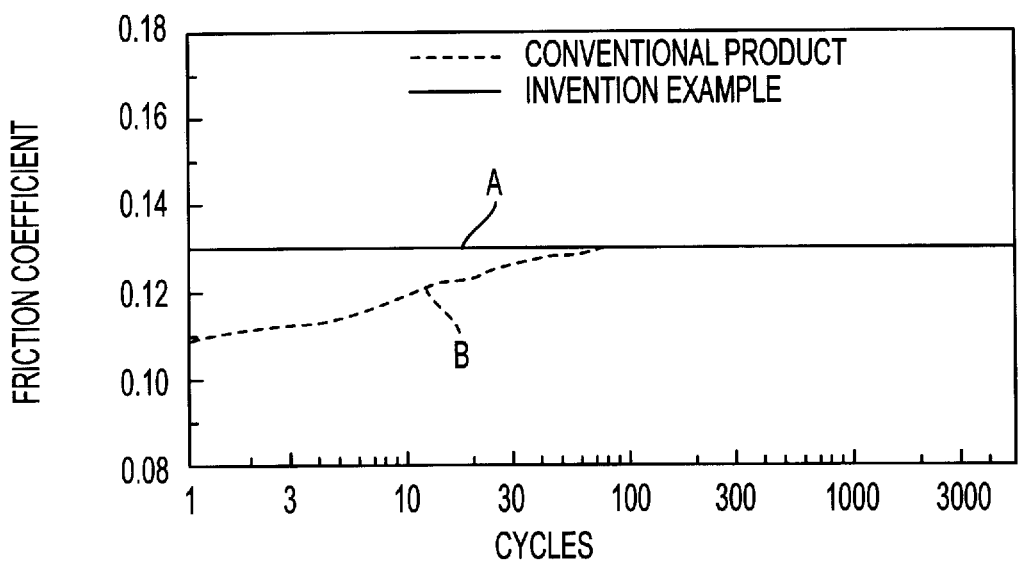
FIG. 1 is a diagram showing the change in friction coefficient as a function of the number of cycles in an embodiment of the present invention as compared to a conventional product.

The present invention is based on the finding that the initial friction coefficient of the surface of a conventional frictional engagement plate is increased as the effective contact area with a mate-member is increased, or as the quantity of thermosetting resin adhering to fibers the surface of the frictional engagement plate is desscased.

If thermosetting resin that is hardened by heating is further heated, its molecular structure is gradually changed, and eventually forms a carbonized structure.

Thermosetting resins for use in the present invention, for example, phenol resin, may become carbonized if treated with a hot plate of 600° C. or more. Such a carbonized structure causes a problem in durability or abrasion resistance.

Therefore, in the present invention, a smooth-faced plate is pressed against a frictional material for 1 to 5 seconds, preferably 1 to 3 seconds at a temperature in a range of from 350° C. to 550° C., preferably of from 400° C. to 500° C., which is lower than the temperature which can change the structure of the thermosetting resin into a carbonized structure by thermal decomposition. Consequently, the resin projecting over the surface of the frictional material is pressed and smoothed so as to increase an effective contact area with a mate- member. As a result, a stable friction coefficient is obtained which is high from initial use and which changes little over the course of time.

If the temperature of the heat treatment is lower than 350° C., adequate surface softness of the thermosetting resin cannot be obtained in a short time, or the degree of surface softness is too low to provide the desired result.

On the other hand, if the treatment is performed at a temperature higher than 550° C., decomposition or carbonization of the thermosetting resin and surface fibers is accelerated and the strength of the frictional material is reduced. As a result, the durability and abrasion resistance is therefore lowered.

The frictional material of the present invention preferably has surface roughness of 5S (JISB 0601) or less, and the applied pressure is preferably 3 to 10 kg/cm², more preferably 5–7 kg/cm².

According to the present invention, the frictional material is first subjected to the above described surface treatment process, and then the frictional material that has been subjected to surface treatment process may be fixed to the surface of a core metal. Alternatively, the frictional material may be subjected to the surface treatment process after the frictional material is fixed to the surface of a core metal.

The frictional material may be formed in the shape of a band. In this case, the friction material is obtained by subjecting a raw material to a conventional process and a surface treatment process of the present invention as described above. Then, this band-shaped frictional material is punched out into a doughnut-like or ring shape, and fixed to the surface of a core metal. Alternatively, other various forms and shapes can be prepared. For example, the frictional material may be punched out into segments. A number of sheets of the frictional material are then fixed to a core metal to cover the surface of the core metal.

EXAMPLE

Figure 2:
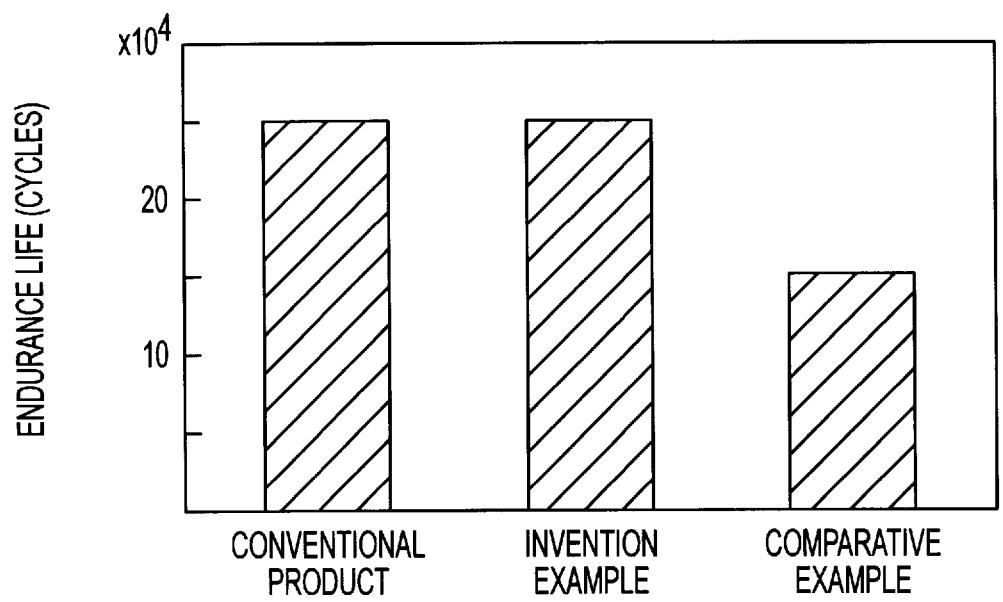
FIG. 2 is a diagram showing the endurance life in the same embodiment of the present invention as compared to the conventional product and a comparative example.
Figure 3:
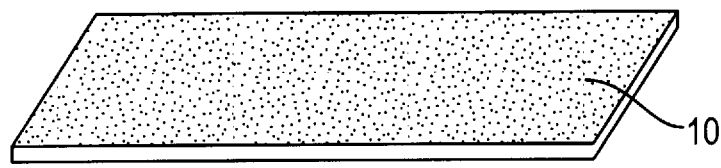
FIG. 3 is a drawing of a band shaped wet frictional material.
Figure 4:
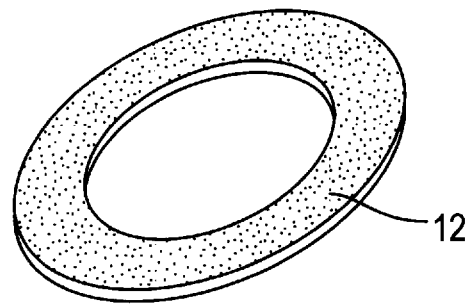
FIG. 4, is a drawing of a ring-shaped wet frictional material.
Figure 5:
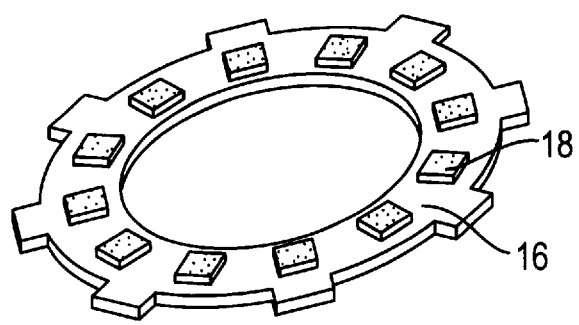
FIG. 5, is a drawing of a wet frictional engagement plate.

As an example of the present invention, a frictional material treated at a treatment temperature of 450° C. for a treatment time of 2 seconds under a treatment pressure of 6 kg/cm² was prepared. Further, another frictional material treated at a treatment temperature of 600° C. for a treatment time of 2 seconds under a treatment pressure of 6 kg/cm² was prepared as a comparative example of surface heat treatment. FIG. 1 shows the change in friction coefficient in the example of the present invention as compared to a conventional product subjected to no surface treatment. FIG. 2 shows the endurance life of the example of the present invention as compared to the comparative example.

In FIG. 1, the ordinate indicates the friction coefficient, and the abscissa indicates the cycle (the number of times of use). The solid line A indicates the change in friction coefficient of the inventive example, and the broken line B indicates the change in friction coefficient of the conventional product. FIG. 1 shows that the friction coefficient of the inventive example was continuously stable from initial use. On the other hand, the friction coefficient of the conventional product was low at the beginning of use, then gradually increased upon further use, and then became stable at about the hundredth cycle.

In FIG. 2, the ordinate indicates the endurance life of the conventional product, the inventive example, and the comparative example. FIG. 2 shows that each of the conventional product and the inventive example has an endurance life of about 250,000 cycles. However, the friction coefficient of the conventional product was not stable as shown by the broken line B in FIG. 1. In the comparative example treated at a high treatment temperature, the endurance life was about 60% that of the inventive example, while its friction coefficient was stable.

The wet frictional engagement plate of the present invention comprises a frictional material that is subjected to the above described surface treatment process. As a result, the friction coefficient is stable from initial use, and the wet frictional engagement plate has good durability.

While the invention has been described in detail and with reference to the specific embodiments thereof, it will be apparent to one skilled in the art that various changes and modifications can be made thereto without departing from the spirit and scope thereof.

What is claimed is:

1. A wet frictional engagement plate comprising:
    a smoothed, surface-heat-treated wet frictional material containing a fiber component, a filler, a friction adjustment agent and a non-carbonized thermosetting resin,
    wherein said smoothed, surface-heat-treated wet frictional material was produced by subjecting a surface of said wet frictional material to a surface treatment process comprising pressing a smooth-faced hot plate at a temperature in a range of 350° C. to 550° C. against the surface of said wet frictional material for a time ranging from 1 to 5 seconds so as to smooth the surface of said wet frictional material without carbonizing the thermosetting resin.

2. A wet frictional engagement plate according to claim 1, wherein said surface treated wet frictional material has a band shape.

3. A wet frictional engagement plate according to claim 1, wherein said surface treated wet frictional material a ring shape.

4. A wet frictional engagement plate according to claim 1, wherein said surface treated wet frictional material has a segment shape.

5. A wet frictional engagement plate according to claim 1 further comprising a core metal having a surface, and wherein said surface treated wet frictional material is fixed onto a surface of the core metal.

6. A wet frictional engagement plate comprising a core metal having a surface and a wet frictional material containing a fiber component, a filler, a friction adjustment agent and a thermosetting resin, said wet frictional material being fixed onto the surface of the core metal, said wet frictional material being produced by subjecting a surface of said wet frictional material to a surface treatment process compromising pressing a smooth-faced hot plate at a temperature in a range of 350° to 550° C. against the surface of said wet frictional material for a time ranging from 1 to 5 seconds so as to smooth the surface of said wet frictional material without carbonizing the thermosetting resin.

7. A wet frictional engagement plate comprising:
    a smoothed, surface-heat-treated wet frictional material containing a fiber component, a filler, a friction adjustment agent and a non-carbonized thermosetting resin.

8. A plate according to claim 7, wherein the surface-heat-treated wet frictional material was produced by pressing an untreated surface of the wet frictional material with a smooth-faced hot plate at a temperature of 350–550° C. for 1–5 seconds to smooth the surface.

* * * * *